(12) United States Patent
Tsai et al.

(10) Patent No.: US 8,473,103 B2
(45) Date of Patent: Jun. 25, 2013

(54) SECONDARY POSITION FEEDBACK CONTROL OF A ROBOT

(75) Inventors: Jason Tsai, Bloomfield Hills, MI (US); Eric Wong, Troy, MI (US); Jianming Tao, Troy, MI (US); H. Dean McGee, Rochester Hills, MI (US); Hadi Akeel, Bloomfield Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 421 days.

(21) Appl. No.: 12/693,537

(22) Filed: Jan. 26, 2010

(65) Prior Publication Data
US 2010/0191374 A1 Jul. 29, 2010

Related U.S. Application Data

(60) Provisional application No. 61/147,484, filed on Jan. 27, 2009.

(51) Int. Cl.
*G05B 19/18* (2006.01)

(52) U.S. Cl.
USPC ........... 700/254; 700/245; 700/250; 700/258; 700/302; 901/9; 901/15; 901/19; 901/46

(58) Field of Classification Search
USPC .................. 700/13, 170, 245, 254; 318/5, 35, 318/92, 567, 628, 823, 568.11, 568.16, 568.17, 318/568.22
See application file for complete search history.

(56) References Cited

U.S. PATENT DOCUMENTS

| 4,608,651 | A | 8/1986 | Murakami et al. |
|---|---|---|---|
| 4,868,475 | A | 9/1989 | Rogozinski et al. |
| 5,155,423 | A | 10/1992 | Karlen et al. |
| 5,581,166 | A * | 12/1996 | Eismann et al. ......... 318/568.22 |
| 5,946,449 | A | 8/1999 | Dickerson et al. |
| 6,258,007 | B1 | 7/2001 | Kristjansson |
| 6,278,902 | B1 * | 8/2001 | Hashimoto et al. ........... 700/245 |
| 6,519,860 | B1 | 2/2003 | Bieg et al. |
| 6,845,295 | B2 | 1/2005 | Cheng et al. |
| 7,184,858 | B2 | 2/2007 | Okazaki et al. |
| 2009/0037022 | A1 * | 2/2009 | Teaford et al. ................ 700/254 |

FOREIGN PATENT DOCUMENTS

| EP | 0 268 495 A2 | 5/1988 |
|---|---|---|
| WO | WO 2007/121357 A2 | 10/2007 |

* cited by examiner

*Primary Examiner* — Mary Cheung
*Assistant Examiner* — Jerrah Edwards
(74) *Attorney, Agent, or Firm* — Fraser Clemens Martin & Miller LLC; William J. Clemens

(57) ABSTRACT

A method of and apparatus for achieving dynamic robot accuracy includes a control system utilizing a dual position loop control. An outer position loop uses secondary encoders on the output side of the gear train of a robot joint axis, while the inner position loop uses the primary encoder attached to the motor. Both single and dual loop control can be used on the same robot and tooling axes.

20 Claims, 4 Drawing Sheets

SECONDARY POSITION FEEDBACK CONTROL OF A ROBOT

CROSS-REFERENCE TO RELATED APPLICATION

This application claims the benefit of U.S. Provisional Patent Application No. 61/147,484 filed on Jan. 27, 2009, hereby incorporated herein by reference in its entirety.

FIELD OF THE INVENTION

This invention relates to a method of achieving dynamic robot accuracy utilizing a novel control approach. A control system uses a dual position loop control; the outer position loop uses secondary encoders on the output side of the gear train of a robot joint axis, while the inner position loop uses the primary encoder attached to the motor. Both single and dual loop control can be used on the same robot and tooling axes.

BACKGROUND OF THE INVENTION

This invention relates to highly accurate robots. Typically, after initial joint angle calibration, the greatest source of error is compliance of the mechanical unit under loading. The greatest amount of this compliance error occurs in the gear train of the robot.

It has been recognized for many years that putting encoders on the output side of the gear train provides the capability of a highly accurate robot. U.S. Pat. No. 5,155,423 describes the encoder on the output side of the gear train: "Torque bridge 421 has mounted on its surface several strain gauges for detecting joint torque. Also, encoder 415 detects the relative rotation of the first structural assembly to the second structural assembly by monitoring the rotation of wire passage tube 438 which is communicated through the coupling represented diagrammatically at 439. The measurement of rotation is taken here so that it is independent of the dynamics of the gear train. These measurements are used for feedback control of the arm motion."

U.S. Pat. No. 4,608,651 describes using primary and secondary encoders used for teaching/playback type of robots. This method uses the differential between the primary and secondary as a control means.

U.S. Pat. No. 6,258,007 describes a motor and reducer assembly that includes both reducer input and output encoders (see FIG. 3 from U.S. Pat. No. 6,258,007).

Traditionally, when secondary encoders are used the position loop of the control system uses the secondary encoder while the velocity loop uses the primary encoder. The pure secondary encoder position control with primary encoder velocity and torque control becomes difficult in the case of interaction between robot axes, such as an inline, three roll wrist. The control loop would need information from other axes during the low level control; this is not always feasible. Also it may not be convenient to use a single control loop at the DSP (Digital Signal Processor) level for the case of advanced calibration techniques that are required for the secondary encoder.

Using the secondary encoder as a measurement system does not provide the response required for more than low speed and stationary motion. Re-orientation or higher speed motion cannot be achieved without integration of the secondary encoders to a closed loop control system.

Also, secondary position feedback has been common in the CNC systems for years. However, this control does not combine both position control by primary encoders and position control by secondary encoders.

It is also well known that properly calibrated encoders attached to the output side of robot axes can provide an accurate position measurement system. This system is traditionally used for open loop control of position for low speed operations, such as stationary drilling.

The closest prior art to this invention is based on the following principle: Using a secondary encoder for position control while using the primary encoder for velocity control. Also, secondary encoders can be used outside the low level control system as a position measurement device to provide open loop position control.

The prior art has the following shortcomings:

The pure secondary encoder position control with primary encoder velocity and torque control becomes difficult in the case of interaction between robot axes, such as an inline, three roll wrist. The control loop would need information from other axes during the low level control; this is not always feasible.

Using the secondary encoder as a measurement system does not provide the response required for more than low speed and stationary motion. Re-orientation or higher speed motion cannot be achieved without integration of the secondary encoders to a closed loop control system.

SUMMARY OF THE INVENTION

This invention uses closed loop control with two position loops. The traditional position loop using the primary encoder attached to the motor is maintained while a second control loop uses the secondary encoder on the output side of the gear train. The output of the second control loop is a command to the primary control loop.

This invention can also combine the traditional secondary encoder feedback loop, where the primary feedback is used for velocity and torque control and the secondary feedback is used for position control on some axes while the dual loop control is used on other axes. The single position loop system could be used for tooling axes and robot axes without mechanical interaction, for instance. The dual position loop system could be used for axes having interaction, or all axes.

The advantage of this system is that it removes the complexity of handling interaction at the level of a single position control loop, while maintaining the capability of higher speed motion with dynamic position maintained by the secondary encoders even for axes with interaction.

Typically one of the position loops in the dual position loop system would be on a host CPU (central processing unit) while the second position loop would be on a servo digital signal processor (DSP).

The invention relates to a method for controlling a robot with high accuracy wherein at least one axis of the robot has a motor with a primary encoder on an input side of a robot joint, the motor being controlled by a servo responsive to an original motion command signal and a feedback signal from the primary encoder, comprising the steps of: a. providing a secondary encoder on an output side of the robot joint; b. detecting a position of the secondary encoder and determining a secondary encoder compensation signal based on a difference between a desired accurate position of the output side of the robot joint represented by the original motion command signal and the secondary encoder detected position; c. converting the secondary encoder compensation signal to units consistent with units of the original motion command signal and the primary encoder feedback signal; and d. outputting a new motion command signal to the servo as a sum of the original motion command signal and the secondary encoder compensation signal for determining a desired accurate position of the output side of the robot joint.

The invention relates to a method for controlling a robot with high accuracy wherein at least one axis of the robot has a motor with a primary encoder on an input side of a robot joint, the motor being controlled by a servo responsive to an original motion command signal and a feedback signal from the primary encoder, comprising the steps of: a. providing a secondary encoder on an output side of the robot joint generating a secondary encoder detected position signal representing an actual position of the robot joint; b. determining a secondary position error signal from the original motion command signal and the secondary encoder detected position signal; c. applying a predetermined gain factor to the secondary position error signal to generate a secondary encoder compensation signal wherein the predetermined gain factor has a maximum value at a zero speed of the robot joint and a zero value at a predetermined speed of the robot joint greater than zero; and d. outputting a new motion command to the servo as a sum of the original motion command signal and the secondary encoder compensation signal for determining a desired accurate position of the output side of the robot joint.

The invention also relates to a system to control a robot to high accuracy comprising: an axis of the robot having a motor with a primary encoder on an input side of a robot joint, the motor being controlled by a servo responsive to an original motion command signal and a feedback signal from said primary encoder; a host CPU for generating the original motion command signal; a secondary encoder on an output side of said robot joint generating a detected position signal; and a secondary position feedback module responsive to the original motion command signal and the secondary encoder detected position signal for generating a secondary encoder compensation signal based on a difference between a desired accurate position of the output side of the robot joint represented by the original motion command signal and the secondary encoder detected position, and wherein said host CPU outputs a new motion command to the servo as a sum of the original motion command signal and the secondary encoder compensation signal for determining a desired accurate position of the output side of the robot joint.

DESCRIPTION OF THE DRAWINGS

The above as well as other advantages of the present invention will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
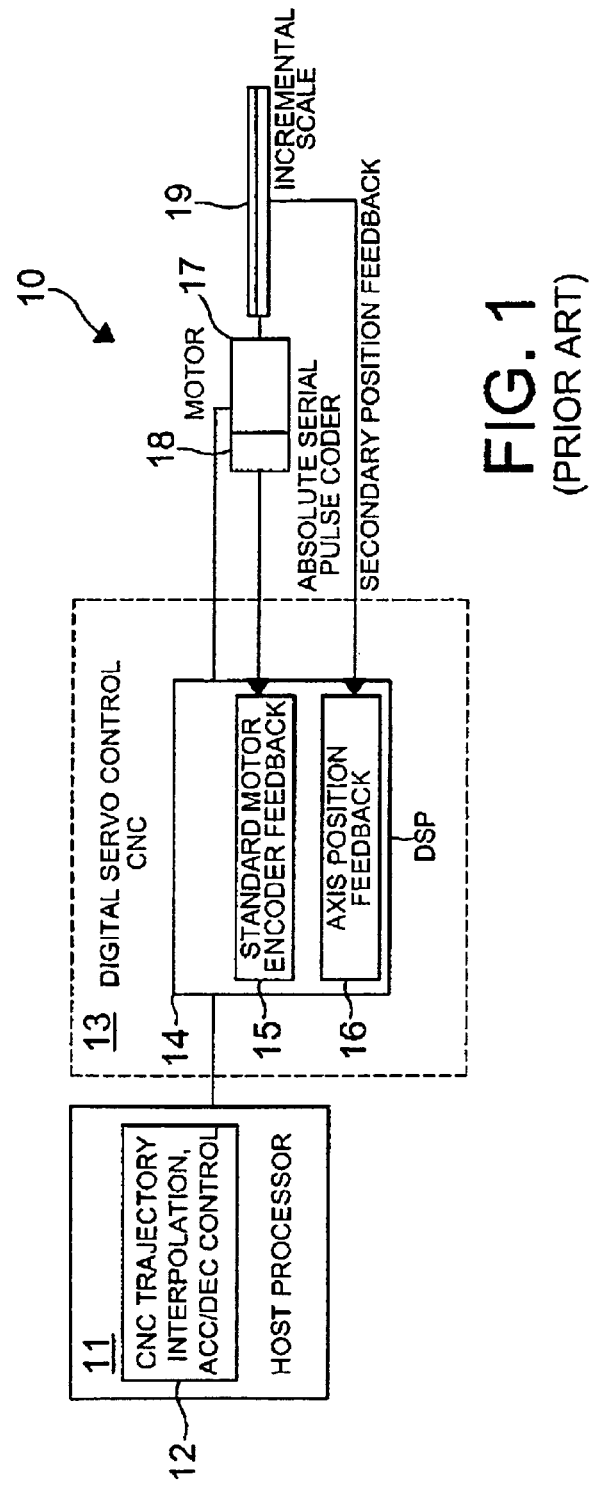
FIG. 1 is a schematic block diagram of a robot controller according to the prior art.

There is shown in FIG. 1 a schematic block diagram of a CNC controller 10 according to the prior art. A host processor 11 includes a CNC trajectory interpolation acceleration/deceleration control 12 connected to a digital servo control 13. The control 13 includes a DSP 14 with a standard motor encoder feedback circuit 15 and an axis position feedback circuit 16. In response to the control signal from the host processor 11, the DSP 14 generates a control signal to a robot motor 17. An absolute serial pulse coder 18 connected to the motor generates a feedback signal to the standard motor encoder feedback circuit 15. An incremental scale secondary encoder generates a secondary position feedback signal to the axis position feedback circuit 16. Thus, this traditional secondary position feedback method replaces the motor encoder 18 for position control with the secondary encoder 19. The primary encoder 18 is still used for velocity control.

The present invention uses closed loop control with two position loops. The traditional position loop using the primary encoder attached to the motor is maintained while a second control loop uses the secondary encoder on the output side of the gear train. The output of the second control loop is a command to the primary control loop.

Figure 2:
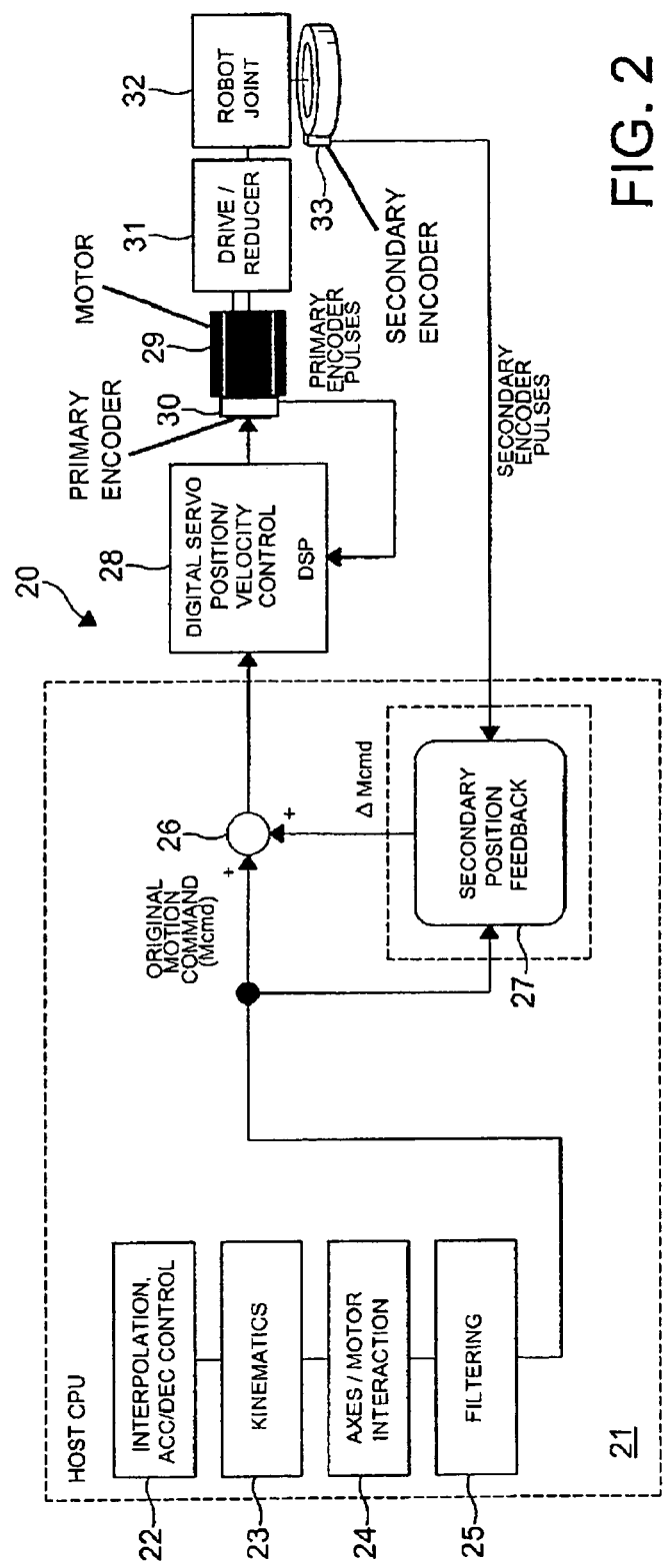
FIG. 2 is a schematic block diagram of a robot controller according to the present invention.

As shown in FIG. 2, a robot controller 20 according to the present invention includes a host processor 21 includes a robot trajectory interpolation acceleration/deceleration control 22 connected to a kinematics module 23, an axes/motor interaction module 24 and a filtering module 25. An output of the filtering module 25 is an original motion command (Mcmd) to a summing junction 26. Also included in the host CPU 21 is a secondary position feedback module 27 that receives the Mcmd signal as an input and generates a difference signal (Mcmd) as a second input to the summing junction 26.

An output from the summing junction 26 is an input to a digital servo position/velocity control 28. The control 28 generates a control signal to a motor 29 and a motor encoder 30 generates a feedback signal in the form of primary encoder pulses to the control 28. The motor 29 actuates a drive/reducer 31 coupled to a robot joint 32. A secondary encoder 33 generates a feedback signal from the robot joint 32 in the form of secondary encoder pulses to the secondary position feedback module 27. This system maintains primary control of both the position and velocity loops at the DSP 28 level, but provides position control using the secondary encoders 33 at the host CPU level.

This invention can also combine the traditional secondary encoder feedback loop, where the primary feedback is used for velocity and torque control and the secondary feedback is used for position control on some axes while the dual loop control is used on other axes. The single position loop system could be used for tooling axes and robot axes without mechanical interaction, for instance. The dual position loop system could be used for axes having interaction, or all axes.

The advantage of this system is that it removes the complexity of handling interaction at the level of a single position control loop, while maintaining the capability of higher speed motion with dynamic position maintained by the secondary encoders even for axes with interaction.

Typically one of the position loops in the dual position loop system would be on a host CPU while the second position loop would be on a servo digital signal processor.

This invention can use absolute or incremental encoders as the secondary encoders or a combination of both.

This invention can employ sophisticated calibration mechanisms for the secondary encoders. It can account for the interaction of the robot axes and can mix having dual encoders on some axes with having a single primary encoder on other axes.

Interaction occurs when motor movement on one axis affects the position of another axis.

One embodiment of the invention includes the following:

The secondary encoder calibration can take a variety of forms, such as harmonic equations or lookup and interpolation tables. The secondary encoder calibration can be combined with traditional robot calibration to determine DH (Denavit-Hartenberg convention) and non-DH parameters such as arm bending or other dynamic effects.

Figure 3:
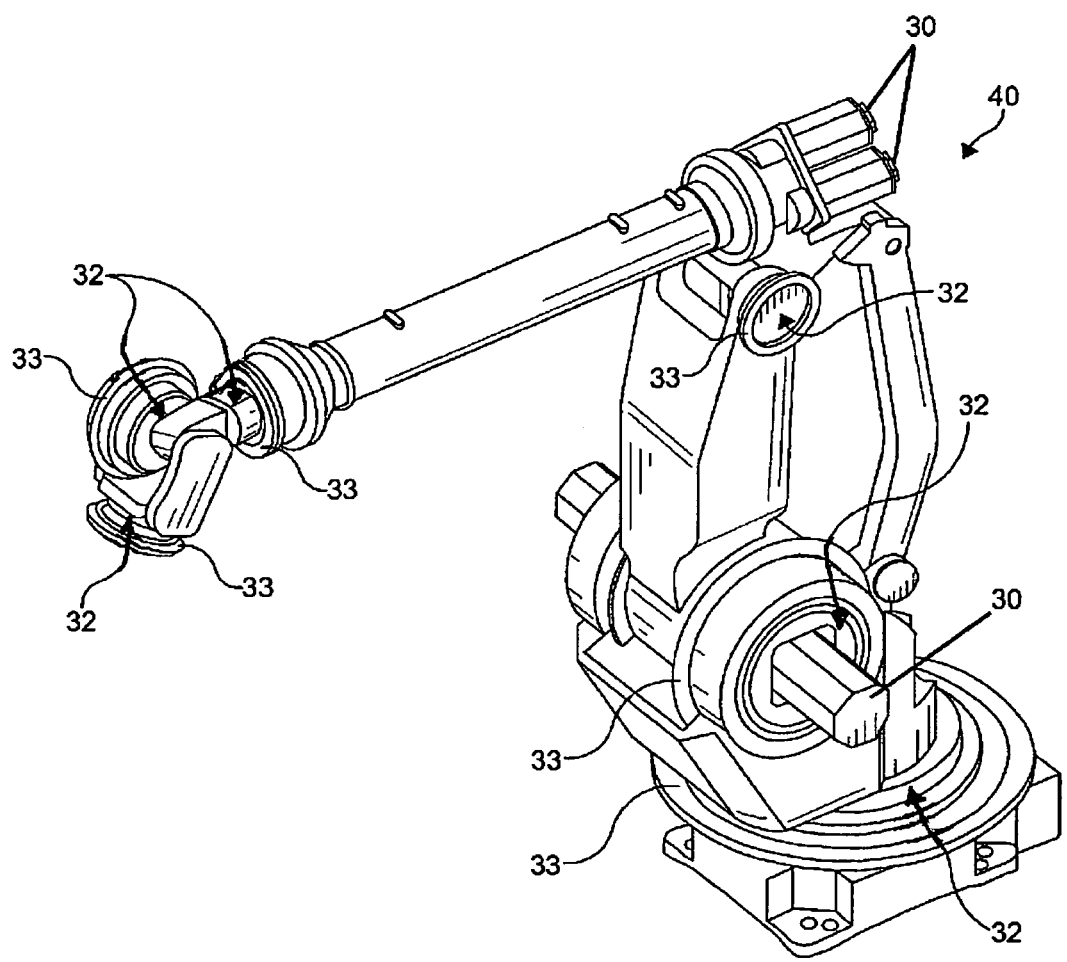
FIG. 3 is a perspective view of a robot including secondary encoders according to the present invention.

Encoder mounting can be integrated with the design of the robot axis or can be installed on existing surfaces on the robot. The encoder can be any type, rotary or linear, optical, magnetic, or other type of encoder suitable for position control of a robot. As shown in FIG. 3, a robot 40 has a plurality of the secondary encoders 33 positioned at the various robot joints 32.

Figure 4:
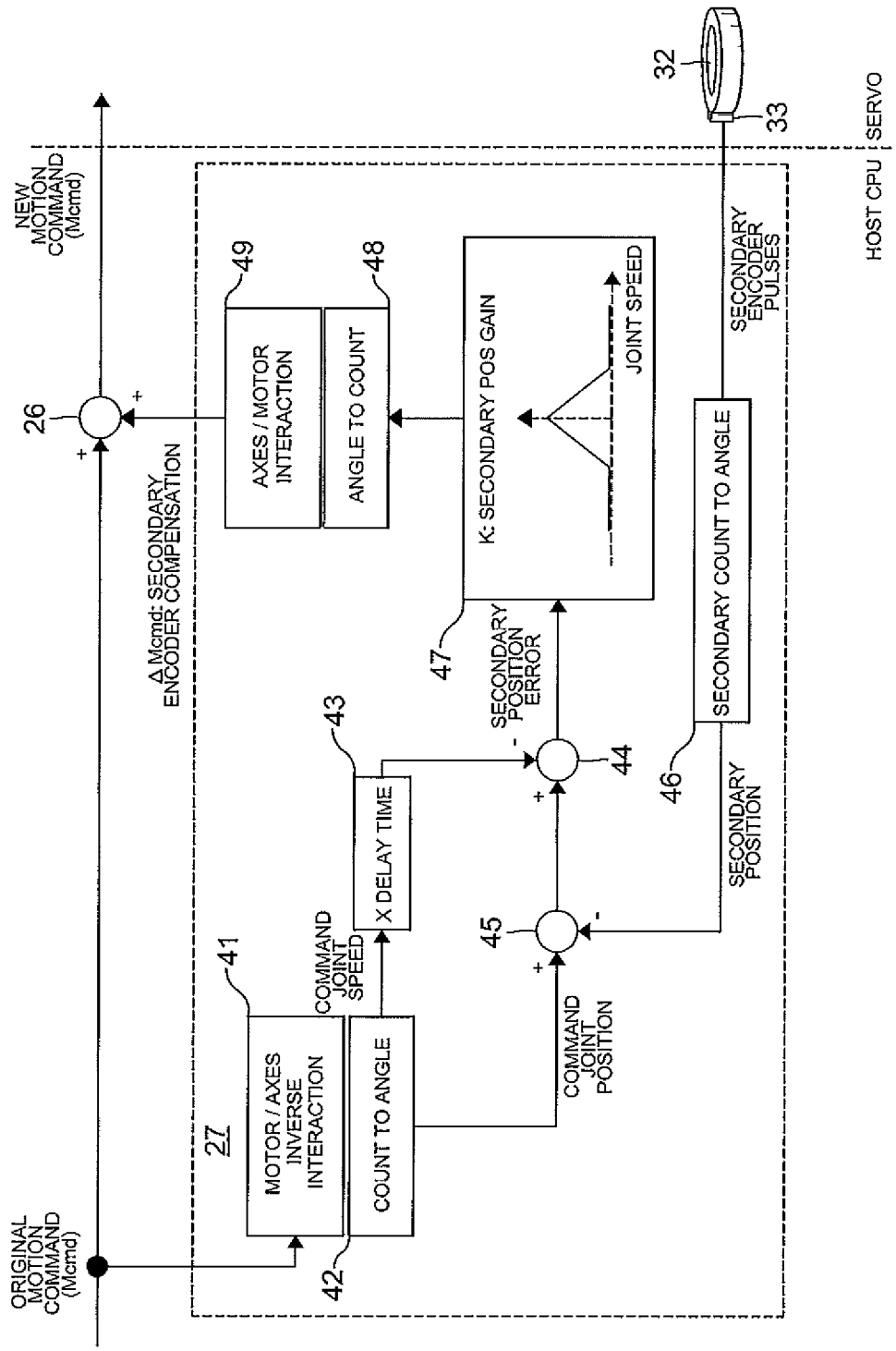
FIG. 4 is a schematic block diagram of the secondary position feedback module shown in FIG. 2.

The encoder output can be read directly by the robot controller. The secondary position feedback module 27 of FIG. 2 is shown in more detail in FIG. 4. The original motion command signal (Mcmd) is an input to a motor/axes inverse interaction module 41 that is connected to a count to angle module 42. The module 42 converts the count units of the Mcmd signal to angle units and generates a command joint speed signal to a delay time module 43 that outputs a signal that is subtracted in a summing junction 44. The count to angle circuit 42 generates a command joint position signal to the summing junction 45. The secondary encoder 33 generates the secondary encoder pulses to a secondary count to angle module 46 that converts the count units of the secondary encoder signal to angle units and generates a secondary position signal to the summing junction 45.

An output from the summing junction 45 is an initial estimate of the secondary position error. However, this includes the effect of servo delay due to the smoothing of the motion command in the servo control. Therefore, an estimate of this servo delay is computed in the module 43 by multiplying the command joint speed by a delay time. The output of module 43 is applied to the summing junction 44 which generates a secondary position error signal to a gain module 47. The module 47 has a secondary position gain factor "K" that is applied to generate a signal to an angle to count module 48 and an axes/motor interaction module 49 connected in series to generate the Δ Mcmd signal to the summing junction 26. The gain factor "K" has a predetermined maximum value at zero speed of the robot joint 32 and reduces to a predetermined minimum value, such as zero, at a predetermined speed of the robot joint in both directions of rotation. The module 48 converts the angle units of the error or difference signal to count units to be compatible with the count units of the original motion command signal. The output from the junction 26 is a new motion command signal Mcmd to the servo 28 of FIG. 2.

The system enters into a "Robot High Accuracy" mode after the robot comes to a stop and a request is made to switch to the "Robot High Accuracy" mode. Once entered, it remains in the "Robot High Accuracy" mode all the time. The system exits out of the "Robot High Accuracy" mode after the robot comes to a stop and a request is made to switch out of the "Robot High Accuracy" mode. The robot automatically exits out of the "Robot High Accuracy" mode during every controller power up.

When in the "Robot High Accuracy" mode, the secondary encoder position is maintained during programmed motion, jogging, and resume motion after a fault.

When in the "Robot High Accuracy" mode, the accurate position is maintained during low speed motion of the robot. When the robot stops moving, the robot high accuracy position is maintained regardless of external forces on the robot.

During robot motion, when joint speed is higher than a predetermined threshold, robot high accuracy control is internally deactivated. When joint speed slows back down to below this predetermined threshold, robot high accuracy control is automatically reactivated.

Whenever servos are active in the "Robot High Accuracy" mode the robot accurate position is maintained.

Servo off time is supported in the "Robot High Accuracy" mode.

Following reset after e-stop or other servo-off alarm in the "Robot High Accuracy" mode the accurate position is maintained.

When in the "Robot High Accuracy" mode, the accurate position is maintained when the program is paused.

When in the "Robot High Accuracy" mode, even when the program with motion control is aborted the robot remains in the "Robot High Accuracy" mode, and the accurate position is still maintained.

The "Robot High Accuracy" mode is axis based. Not all axes in a group need to have secondary encoders installed. Only the axes with secondary encoders installed and set up will be controlled to the accurate position.

Multi-group programs are supported in the "Robot High Accuracy" mode. In this mode, all axes in all groups having robot high accuracy set up will be controlled to the robot high accuracy position.

If axes have interaction and not all interaction axes have secondary encoders set up, the interaction effect of the robot high accuracy control will be applied to axes having interaction but not having secondary encoders. Thus, for example, if a secondary encoder is installed on J5 but not on J6, the motor for #6 will move based on interaction and the robot high accuracy control of J5.

When a position is manually recorded for a line within a program, the current robot high accuracy position is automatically used. No further user interaction/confirmation is required.

System variables such as stoperrlim, stoptol, etc., may be modified when in the "Robot High Accuracy" mode. An alternative method of determining corresponding system errors is used.

When not in the "Robot High Accuracy" mode, the system behaves the same as a system where high accuracy software is not installed.

Another embodiment of the invention includes the following functions and limitations of the secondary encoder feedback system include:

The system enters into the "Robot High Accuracy" mode after the robot comes to a stop and a request is made switch to the "Robot High Accuracy" mode. Once entered, it remains in the "Robot High Accuracy" mode all the time. The system exits out of the "Robot High Accuracy" mode after the robot comes to a stop and a request is made to switch out of the "Robot High Accuracy" mode. The robot will automatically exit out of the "Robot High Accuracy" mode during every controller power up.

When in the "Robot High Accuracy" mode, the secondary encoder position is maintained during programmed motion, jogging, and resume motion after a fault.

When in the "Robot High Accuracy" mode, the accurate position is maintained throughout the low speed motion of the robot. When the robot stops moving, the robot high accuracy position is maintained regardless of external forces on the robot.

Some provision is made for low speed motion while maintaining high accuracy position. During robot motion, when joint speed is higher than a predetermined threshold, robot high accuracy control is internally de-activated. When the joint speed slows back down to below this predetermined threshold, robot high accuracy control is automatically re-activated.

Whenever servos are active in the "Robot High Accuracy" mode and the robot joint speed is below a predetermined threshold, the robot accurate position is maintained.

Following reset after e-stop or other servo-off alarm in the "Robot High Accuracy" mode the accurate position is maintained.

When in the "Robot High Accuracy" mode and the program is paused, the robot accurate position is maintained.

When in the "Robot High Accuracy" mode, even when the program with motion control is aborted the robot remains in the "Robot High Accuracy" mode, and the accurate position is still maintained.

The "Robot High Accuracy" mode is axis based. Not all axes in a group need to have secondary encoders installed. Only the axes with secondary encoders installed and set up will be controlled to the accurate position.

Multi-group programs are supported in the "Robot High Accuracy" mode. In this mode, all axes in all groups having robot high accuracy set up will be controlled to the robot high accuracy position.

If axes have interaction and not all interaction axes have secondary encoders set up, the interaction effect of the robot high accuracy control will be applied to axes having interaction but not having secondary encoders. Thus, for example, if a secondary encoder is installed on J5 but not on J6, the motor for #6 will move based on interaction and the robot high accuracy control of J5.

When a position is manually recorded for a line within the program, the current robot high accuracy position is automatically used. No further user interaction/confirmation is required.

System variables such as stoperrlim, stoptol, etc., may be modified when in the "Robot High Accuracy" mode. An alternative method of determining corresponding system errors is used.

When not in the "Robot High Accuracy" mode, the system behaves the same as a system where high accuracy software is not installed.

No motion is allowed in the system when entering and leaving the "Robot High Accuracy" mode. Typically, a FINE termtype motion is used before a request is made to enter the "Robot High Accuracy" mode, and similarly a FINE termtype motion is used before a request is made to exit the "Robot High Accuracy" mode.

Another embodiment of the invention includes that the system is always in the "Robot High Accuracy" mode and that all motions use both the primary and secondary encoders.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling a robot with high accuracy wherein at least one axis of the robot has a motor with a primary encoder on an input side of a robot joint, the motor being controlled by a servo responsive to an original motion command signal and a feedback signal from the primary encoder, comprising the steps of:
   a. providing a secondary encoder on an output side of the robot joint;
   b. detecting a position of the secondary encoder and determining a secondary encoder compensation signal based on a difference between a desired accurate position of the output side of the robot joint represented by the original motion command signal and the secondary encoder detected position;
   c. converting the secondary encoder compensation signal to units consistent with units of the original motion command signal and the primary encoder feedback signal; and
   d. outputting a new motion command signal to the servo as a sum of the original motion command signal and the secondary encoder compensation signal for determining a desired accurate position of the output side of the robot joint.

2. The method according to claim 1 wherein the original motion command signal and a secondary encoder detected position signal are generated in count units which are converted to angle units prior to determining the secondary encoder compensation signal.

3. The method according to claim 1 wherein the secondary encoder compensation signal is converted from angle units to count units in said step c.

4. The method according to claim 1 including determining the secondary encoder compensation signal in step b, by determining a secondary position error signal by first subtracting a secondary encoder detected position signal from a command joint position signal to generate an initial secondary position error, the initial secondary position error including position error due to an effect of motion command smoothing in a servo control which can be estimated by multiplying a command joint speed signal by a delay time to generate an estimate, and determining the secondary position error signal by subtracting the estimate from the initial secondary position error to generate the secondary encoder compensation signal.

5. The method according to claim 4 wherein the command joint speed signal is multiplied by a predetermined delay time to estimate the portion of the position error due to motion command smoothing in servo control.

6. The method according to claim 4 wherein the secondary position error signal is modified by a predetermined gain factor to determine the secondary encoder compensation signal.

7. The method according to claim 6 wherein the predetermined gain factor has a maximum value at a zero speed of the robot joint and a minimum value at a predetermined speed of the robot joint greater than zero in either direction of rotation of the robot joint.

8. The method according to claim 7 wherein the predetermined gain factor minimum value is zero.

9. The method according to claim 1 wherein the robot has another axis having another motor with another primary encoder on an input side of another robot joint and another secondary encoder on an output side of the another robot joint, the another motor being controlled by another servo utilizing a feedback signal from the another primary encoder for velocity control of the another robot joint and utilizing a feedback signal from the another secondary encoder for position control of the another robot joint.

10. A method for controlling a robot with high accuracy wherein at least one axis of the robot has a motor with a primary encoder on an input side of a robot joint, the motor being controlled by a servo responsive to an original motion command signal and a feedback signal from the primary encoder, comprising the steps of:
   a. providing a secondary encoder on an output side of the robot joint, the secondary encoder generating a secondary encoder detected position signal representing an actual position of the robot joint;
   b. determining a secondary position error signal from the original motion command signal and the secondary encoder detected position signal;
   c. applying a predetermined gain factor to the secondary position error signal to generate a secondary encoder compensation signal wherein the predetermined gain factor has a maximum value at a zero speed of the robot joint and a zero value at a predetermined speed of the robot joint greater than zero; and
   d. outputting a new motion command to the servo as a sum of the original motion command signal and the secondary encoder compensation signal for determining a desired accurate position of the output side of the robot joint.

11. The method according to claim 10 wherein the original motion command signal and a secondary encoder detected position signal are generated in count units which are converted to angle units prior to generating the secondary encoder compensation signal.

12. The method according to claim 10 wherein the secondary encoder compensation signal is converted from angle units to count units after said step c.

13. The method according to claim 10 including performing said step b by subtracting the secondary encoder detected position signal from a command joint position signal, and subtracting a product of a command joint speed signal and a delay time, to determine the secondary position error signal.

14. The method according to claim 13 wherein the command joint speed signal is multiplied by a predetermined delay time to estimate a portion of position error due to an effect of motion command smoothing by a servo control.

15. A system to control a robot to high accuracy comprising:
   a motor with a primary encoder, the motor being coupled to an input side of a robot joint, the motor being controlled by a servo responsive to an original motion command signal and a feedback signal from said primary encoder;
   a host CPU for generating the original motion command signal;
   a secondary encoder on an output side of said robot joint generating a detected position signal; and
   a secondary position feedback module responsive to the original motion command signal and the secondary encoder detected position signal for generating a secondary encoder compensation signal based on a difference between a desired accurate position of the output side of the robot joint represented by the original motion command signal and the secondary encoder detected position, and wherein said host CPU outputs a new motion command to the servo as a sum of the original motion command signal and the secondary encoder compensation signal for determining a desired accurate position of the output side of the robot joint.

16. The system according to claim 15 wherein the original motion command signal and a secondary encoder detected position signal are generated in count units and said secondary position feedback module includes count to angle modules for converting the count units to angle units prior to generating the secondary encoder compensation signal.

17. The system according to claim 15 wherein said secondary position feedback module includes an angle to count circuit for converting the secondary encoder compensation signal from angle units to count units.

18. The system according to claim 15 including an inverse interaction circuit for converting the original motion command signal into a command joint speed signal and a command joint position signal, a first summing junction for subtracting the secondary encoder detected position signal from the command joint position signal, a second summing junction connected to an output of said first summing junction for subtracting the command joint speed signal multiplied by a delay time and generating a secondary position error signal, and a gain circuit for modifying the secondary position error signal by a predetermined gain factor to generate the secondary encoder compensation signal.

19. The system according to claim 18 including a delay time module for multiplying the command joint speed signal by a predetermined delay time before subtraction at said second summing junction.

20. The system according to claim 18 wherein the predetermined gain factor has a maximum value at a zero speed of the robot joint and a minimum value at a predetermined speed of the robot joint greater than zero.

* * * * *